(12) United States Patent
Numaoka et al.

(10) Patent No.: US 8,639,565 B2
(45) Date of Patent: *Jan. 28, 2014

(54) ADVERTISEMENT SPACE AUCTION METHOD, APPARATUS AND STORAGE MEDIUM

(75) Inventors: Chisato Numaoka, Kanagawa (JP);
Etsuro Sakamoto, Tokyo (JP);
Motoyuki Koike, Kanagawa (JP);
Takeru Kojima, Kanagawa (JP)

(73) Assignee: Sony Corporation (JP)

( * ) Notice: Subject to any disclaimer, the term of this patent is extended or adjusted under 35 U.S.C. 154(b) by 48 days.

This patent is subject to a terminal disclaimer.

(21) Appl. No.: 12/221,970

(22) Filed: Aug. 8, 2008

(65) Prior Publication Data

US 2009/0055272 A1 Feb. 26, 2009

Related U.S. Application Data

(62) Division of application No. 10/052,962, filed on Jan. 18, 2002.

(30) Foreign Application Priority Data

Jan. 22, 2001 (JP) ................................ P2001-013524

(51) Int. Cl.
*G06Q 40/00* (2012.01)
(52) U.S. Cl.
USPC ......................................... 705/14.1; 705/26.3
(58) Field of Classification Search
USPC ............................................... 705/14.4, 26.3
See application file for complete search history.

(56) References Cited

U.S. PATENT DOCUMENTS

| 6,236,977 B1 | 5/2001 | Verba et al. |
| 6,243,104 B1 * | 6/2001 | Murray ......................... 345/629 |
| 6,269,361 B1 * | 7/2001 | Davis et al. ........................... 1/1 |

(Continued)

FOREIGN PATENT DOCUMENTS

| JP | 9-010440 A | 1/1997 |
| JP | 2001514772 T | 9/2001 |

(Continued)

OTHER PUBLICATIONS

Caid, L. A. (1966). A Bayesian Approach to Competitive Bidding. (Order No. 6615072, The Ohio State University). ProQuest Dissertations and Theses, , 254-254 p. Retrieved from http://search.proquest.com/docview/302211749?accountid=14753. (302211749).*

(Continued)

*Primary Examiner* — Muriel Tinkler
(74) *Attorney, Agent, or Firm* — Lerner, David, Littenberg, Krumholz & Mentlik, LLP (57) ABSTRACT

An advertisement space auction apparatus enabling for a more strategic and open auction transaction to be realized is provided. The advertisement space auction apparatus using a network, comprising a memory storing advertisement space information and being accessible by a plurality of entities connected to the network, a bid data communication unit receiving a bid data submitted via the network from at least one of the plurality of entities, the bid data corresponding to the advertisement space information stored in the memory; and a winning bidder determination unit determining a winning bidder of an advertisement space designated by the advertisement space information, on the basis of the bid data received by the bid data communication unit.

12 Claims, 7 Drawing Sheets

(56) References Cited

U.S. PATENT DOCUMENTS

| | | |
|---|---|---|
| 6,285,987 B1 * | 9/2001 | Roth et al. ............. 705/14.71 |
| 6,443,841 B1 * | 9/2002 | Rossides ................. 463/25 |
| 6,691,094 B1 * | 2/2004 | Herschkorn ............. 705/37 |
| 6,868,389 B1 | 3/2005 | Wilkins et al. |
| 6,871,190 B1 | 3/2005 | Seymour et al. |
| 6,934,692 B1 | 8/2005 | Duncan |
| 7,058,593 B1 | 6/2006 | Merritt |
| 7,574,375 B1 * | 8/2009 | Fraser et al. ............. 705/26.25 |
| 7,987,134 B1 * | 7/2011 | Johnson ................. 705/37 |
| 2001/0037205 A1 | 11/2001 | Joao |
| 2001/0042038 A1 | 11/2001 | Phatak |
| 2001/0052000 A1 * | 12/2001 | Giacalone, Jr. ........... 709/218 |
| 2002/0029186 A1 | 3/2002 | Roth et al. |
| 2002/0147675 A1 | 10/2002 | Das et al. |
| 2003/0036949 A1 | 2/2003 | Kaddeche et al. |
| 2003/0055729 A1 | 3/2003 | Bezos et al. |

FOREIGN PATENT DOCUMENTS

| | | | |
|---|---|---|---|
| KR | 20000036464 A | | 7/2000 |
| KR | 2000-0049506 A | | 8/2000 |
| WO | 9834189 A1 | | 8/1998 |
| WO | 0064165 A1 | | 10/2000 |

OTHER PUBLICATIONS

Fisher, J. G. (1987). The Allocation Mechanism of Audits: An Experimental Approach. (Order No. 8709997, The Ohio State University). ProQuest Dissertations and Theses, , 204-204 p. Retrieved from http://search.proquest.com/docview/303618558?accountid=14753. (303618558).*

Brannman, L. E. (1996). Potential competition and possible collusion in forest service timber auctions. Economic Inquiry, 34(4), 730-745. Retrieved from http://search.proquest.com/docview/200833956?accountid=14753.*

Office Action from Japanese Application No. 2001-013524, dated May 11, 2010.

Tetsuo Takizawa, Easy understanding of the structure of Internet stock exchange between companies by use of ilustration, Japan, Asuka F products, Oct. 31, 2000, First edition, p. 164-165.

Office Action from Japanese Application No. 2001-013524, dated Jan. 18, 2011.

* cited by examiner

ADVERTISEMENT SPACE AUCTION METHOD, APPARATUS AND STORAGE MEDIUM

CROSS-REFERENCE TO RELATED APPLICATIONS

This application is a divisional of U.S. application Ser. No. 10/052,962 filed on Jan. 18, 2002 which claims priority from Japanese Patent Application JP 2001-013524, filed Jan. 22, 2001, all of which are incorporated herein by reference.

BACKGROUND OF THE INVENTION

1. Field of the Invention

The present invention relates to an advertisement space auction method, an apparatus, and a storage medium thereof.

2. Description of the Related Art

There exist a variety of advertisements in the modern society such as (1) a mass media type advertisement to be broadcasted on TVs, radios, posted on journals and the like, (2) a public advertisement to be displayed in a public space such as in sports stadium, a theater and the like, and (3) a one-to-one type advertisement such as a banner advertisement posted on an internet web site, a direct mail and the like. These various types of advertisements accommodate respective advertisement spaces for which an advertiser, who wants to advertise a product or an item, can obtain a right to post his/her advertisement through transaction of the advertisement spaces.

SUMMARY OF THE INVENTION

However, according to a conventional method of transaction for the advertisement spaces, there has been such a problem that its method of transaction is likely to depend largely on a specific relationship between an advertisement provider and an advertiser/advertisement agent, and thus not open to the public.

On the other hand, there has been disclosed such an internet auction method directing to the advertisement in Japan Patent Application Laid-open No. 2000-501868. An object of transaction according to this advertisement auction method is directed to an abstract object of catching attention of consumers. In order to implement its object, it is essential to extract preference and trend of the consumers appropriately and precisely.

Because the preference and trend of the consumers thus extracted in the above cited advertisement auction method contain pieces of private information, the following constraints are attached for the purpose of privacy protection. Namely, when providing pieces of private information to an advertiser, it is requested to obtain a consent from an individual who is a proprietor thereof prior to provision of the private information, and no advertiser without acquisition of the consent from the individual is allowed to receive the information. As a result, the above cited advertisement auction method has a problem that a scope of advertisers who can participate in the auction is inevitably limited thereby preventing realization of a fully open transaction.

Further, the above cited advertisement auction method has another problem that in order to prevent a leak of the private information, adoption of a special technique relating to security, for example, such as encryption technique becomes necessary.

Therefore, it is desirable to provide an advertisement space auction method, an apparatus, a storage medium or a computer program therefor that enables execution of an open advertisement transaction.

According to an aspect of the present invention, in order to alleviate the above-mentioned problems, an advertisement space auction method using a network is provided. The method comprises: storing of advertisement space information in a memory which can be accessed by a plurality of entities which are coupled to the network; receiving of bid data sent from at least one of the plurality of entities via the network for the advertisement space information stored in the memory; and determining of a winning bidder for an advertisement space corresponding to the advertisement space information on the basis of the bid data received.

According to another aspect of the present invention, an advertisement space auction apparatus using a network is provided. The apparatus comprises: a memory storing advertisement space information which can be accessed by a plurality of entities coupled to the network; a bid data communication unit receiving bid data sent from at least one of the plurality of entities via the network for the advertisement space information stored in the memory; and a winning bidder determination unit determining a winning bidder for an advertisement space corresponding to the advertisement space information on the basis of the bid data received by the bid data communication unit.

According to still another aspect of the present invention, a computer program and/or a storage medium storing the computer program are provided for realizing an advertisement space auction method using a network. The advertisement space auction method using a network comprises: storing of advertisement space information in a memory which can be accessed by a plurality of entities coupled to the network; receiving of bid data sent from at least one of the plurality of entities via the network for the advertisement space information stored in the memory; and determining of a winning bidder for an advertisement space corresponding to the advertisement space information on the basis of the bid data received.

In the aspects of the present invention, the advertisement space information is stored in the memory to which the plurality of entities connected via the network are allowed to access. Then, bid data sent from the plurality of entities via the network for the advertisement space information stored in the memory are received and used for determining a winning bidder for the advertisement space corresponding to the advertisement space information. Accordingly, it is enabled to execute an auction process of the advertisement space on the network that is fully open to the public.

Further, in the aspects of the present invention, because the advertisement space may be posted for auctioning on the network such as the internet, there are such advantages that the number of advertisers who can take part in the auctioning is not limited, and that a more open transaction of the advertisement space can be executed.

According to still another aspect of the present invention, an auction management server and an advertisement space information server may be provided for controlling bidding for the advertisement space auctioning and determining a winning bidder. Accordingly, there is such an advantage that the transaction of the advertisement space can be executed automatically.

According to still another aspect of the present invention, a format data for entry of the auctioning bid information may be provided from an auction system to the bidders. Accordingly, there is such an advantage that any arbitrary bidder is allowed to participate in the advertisement space auctioning.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DESCRIPTION OF THE PREFERRED EMBODIMENTS OF THE INVENTION

Figure 1:
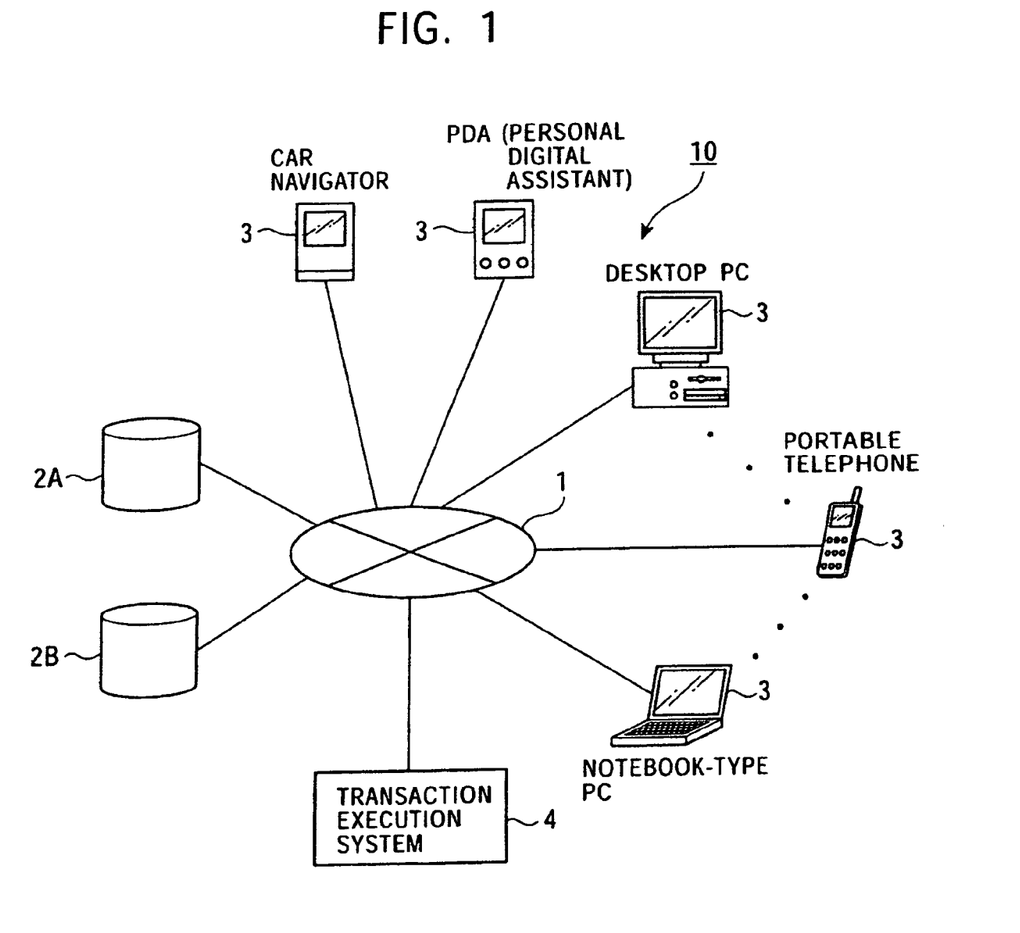
FIG. 1 is a schematic block diagram indicating an auction system and an example of its configurations according to the invention.

A preferred embodiment of the present invention will be described in the following with reference to the accompanying drawings. FIG. 1 shows an example of configurations of an auction system 10 according to an embodiment according to the present invention. In the auction system 10, an auction management server 2A and an advertisement space information management server 2B function as servers for sellers in the auction, and are connected to a network 1. Further, a transaction execution system 4 comprising, for example, a computer apparatus is connected to the network 1. An open network such as the internet can be used for the network 1.

Further, a plurality of terminal apparatuses 3, that are terminals on the side of auction bidders, comprise computers and are connected to the network 1. Users who access to the network 1 using terminal apparatuses 3, which are examples of entities existing on the network 1, are allowed to participate in an advertisement space auction process to be provided by the auction system 10 and make bid offers. The terminal apparatuses 3 connected to the network 1 may be assigned with a unique identification information, respectively. According to this unique identification information, the auction system 10 can identify each of the plurality of the terminal apparatuses 3.

Figure 2:
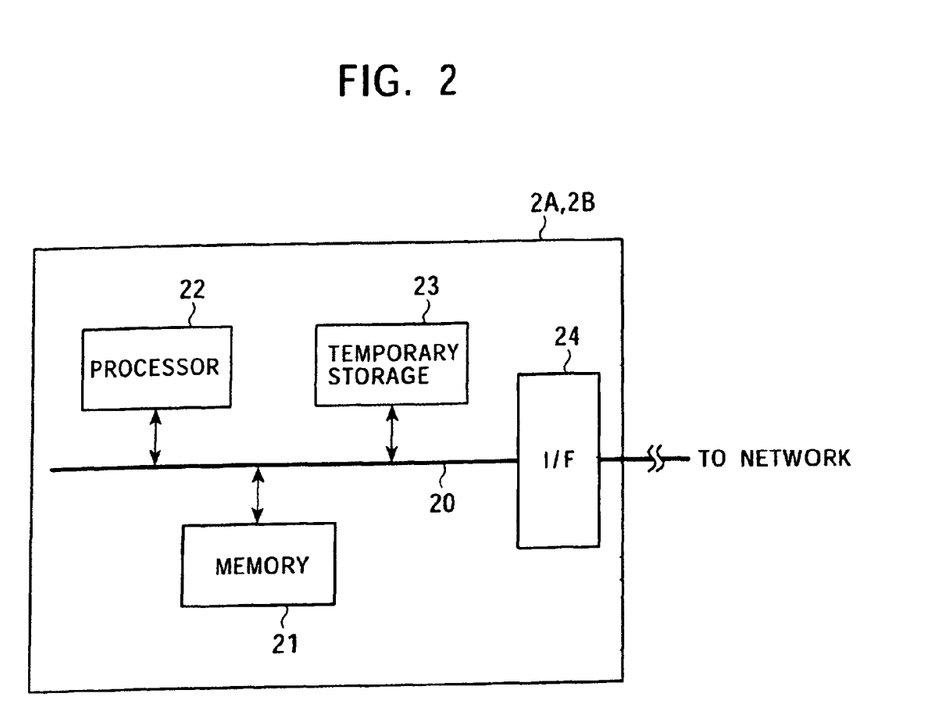
FIG. 2 is a schematic block diagram indicating an exemplary construction of an auction management server and/or an advertisement space information management server of the invention.

With reference to FIG. 2, an example of arrangements of the auction management server 2A and the advertisement space information management server 2B is shown. These auction management server 2A and the advertisement space management server 2B may be implemented with common components and parts. Therefore, both arrangements will be described here represented by an example of the auction management server 2A. In the auction management server 2A, a storage section 21 comprising, for example, a hard disk drive, a processing section 22 comprising, for example, a CPU (central processing section), and a temporary storage section 23 comprising, for example, a memory are connected to a bus 20. The bus 20 is connected to a network 3 via an I/F (interface) section 24. The I/F section 24 functions as an interface for controlling communication between the auction management server 2A and the network 3. The storage section 21 may be built not only with a rewritable storage medium but also with an un-rewritable storage medium provided that information can be written in. For example, a hard disk, a magnetic disk, a magneto-optical disk, an optical disk and the like can be used to the storage section 21.

The auction management server 2A having the above-mentioned arrangement enables operation and control of the auction process on the basis of various pieces of information stored in its own storage section 21 of the auction management server 2A and a plurality of bid information sent from the plurality of terminal apparatuses 3 via the network 1. For example, in the auction management server 2A, the plurality of bid information sent from the terminal apparatuses 3 are tabulated, and bid status information for its advertisement space is generated on the basis of a result of the tabulation. Furthermore, in the auction management server 2A, after the tabulation of the bid information submitted from the terminal apparatuses 3, a winning bidder is determined for each advertisement space in accordance with a preset rule.

The preset rule for determining the winning bidder in the auction management server 2A will be described in the following. In the embodiment of the present invention, either one of the following three conditions (1) through (3) or any arbitrary combination of these three conditions can be used as the preset rule for determining the winning bidder.

(1) A winning bidder is one who offers a highest bid price to an advertisement space posted on the internet auction within a bid submission period permitted therefor.

(2) A winning bidder is one who has offered a highest bid price to an advertisement space provided that no more bid information is received after elapse of a predetermined period of time since the acceptance of the last bid information to the advertisement space.

(3) A winning bidder is determined by extracting candidates from among bidders those who actually have paying capacity (ability to pay) of their offered prices to an advertisement space, and determining a winning bidder who offered the highest bid price to the advertisement space among the candidates. By way of example, the information on the paying capacity of the bidders is preferably stored in the auction system 10.

The above-described bid status information and the winning bidder information indicative of the winning bidder thus determined on the basis of the preset rules are transmitted from the auction management server 2A to each terminal apparatus 3, the advertisement space information management server 2B and the transaction execution system 4 via the network 1.

In the advertisement space information management server 2B, various advertisement space information relating to its advertisement space to be posted on auction is stored in a database and managed. In the auction system 10 of the present embodiment, by means of this advertisement space-information management server 2B, each user who accessed from each terminal apparatus 3 is provided with the advertisement space information.

The transaction execution system 4 executes a transaction of the advertisement space with the winning bidder on the basis of a result of auctioning performed by the system. When its transaction is agreed upon, a piece of advertisement information which is desired to be posted in the advertisement space is sent from the winning bidder via the terminal apparatus 3 to the transaction execution system 4. Then, in accordance with the terms and conditions of their transaction agreement, the advertisement information designated by the winning bidder is provided to the users of the contents by means of the transaction execution system 4. Further, the transaction execution system 4 executes a charging and settlement of account processing with the winning bidder.

The above-mentioned auction system 10 can be constructed using, for example, an auction program which is stored in the storage medium. The auction program embodying the present invention has an auction management section comprising a bid information tabulation module, a bid information generation module, a winning bidder determination module and a bid status information-providing module. At the same time, the auction program embodying the present embodiment has an advertisement space information management section comprising an advertisement space information storage module, an advertisement space information extraction module, an advertisement space information providing module, and a winning bid transaction module. The auction management section is applied, for example, as the auction management server 2A. Further, the advertisement space information management section is applied, for example, as the advertisement space information management server 2B.

For example, in the servers 2A or 2B, the auction program is store in advance in the storage section 21. At the time of execution, the program is read out from the storage section 21 and stored once in a temporary storage section 23, then read into the processing section 22 for its execution.

A respective function of each module has in the above-mentioned auction management section will be described. The bid information tabulation module enables the auction management server 2A to function as a bid information tabulation means for tabulating the bid information entered via the I/F 24. The bid status information generation module enables the auction management server 2A to function as a bid status information generation means for generating bid status information with respect to the advertisement space on the basis of the bid information tabulated. The bid status information providing module enables the auction management server 2A to function as a bid status information providing means for outputting the bid status information via the I/F 24 to the network 1 and forwarding the same to one or more addresses. Here, the one or more addresses of recipient addressees described above contain the address of an sender of the bid information. The winning bidder determination module enables the auction management server 2A to function as a winning bidder determination unit for determining a winning bidder with respect to each advertisement space on the basis of a result of tabulated bid information and in accordance with predetermined one or more rules. Here, either one of the above-mentioned three conditions (1) to (3), or any arbitrary combination of these three conditions (1) to (3) may be applied as the preset rules. The winning bidder information providing module enables the auction management server 2A to function as a winning bidder information providing means for outputting the winning bidder information from the I/F 24 to the network 1 and forwarding the same to the one or more addresses on the network. Here, the one or more addresses of the recipient addressees contain the address of the bid information sender.

The functions of the above-mentioned each module has in the advertisement space information management section will be described in the following. The advertisement space information storage module enables the advertisement space information management server 2B to function as an advertisement space information memory for storing a data base of the advertisement space information. The advertisement space information extraction module enables the advertisement space information management server 2B to function as an advertisement space information extraction means for extracting advertisement space information corresponding to access information entered via the I/F section 24 from the above-mentioned data base of the advertisement space information stored in the storage section 21. The advertisement space information providing module enables the advertisement space information management server 2B to function as an advertisement space information providing means for outputting the advertisement space information which was extracted from the data base as well as the format data for entering the bid information via the I/F section 24. The winning bid transaction module enables the advertisement space information management server 2B to function as a winning bid transaction means for executing a winning bid transaction and deleting the advertisement space information corresponding to the winning bid information entered via the I/F section 24 from the data base of the advertisement space information.

The auction program according to the present embodiment can be supplied as recorded in a predetermined storage medium which can be distributed such as a CD-ROM (compact disk-read only memory). For example, in the servers 2A and/or 2B, program data of the auction program is read from the storage medium by means of a record reader (not indicated), stored in the storage section 21, and installed in the system. Further, the auction program according to the present embodiment can also be recorded in such a storage medium that is not intended for distribution as above. For example, the auction program can be installed in the servers 2A and/or 2B by downloading from the other computer apparatus (not indicated) via the network 1.

At the time of implementation of the auction system 10, the auction management section of the auction program is installed in the auction management server 2A. On the other hand, the advertisement space information management section of the auction program is installed in the advertisement space information management server 2B. Further, in the advertisement space information server 2B, the database of the advertisement space information and the format data of the bid information are stored. Through these installing steps, the auction system 10 is constructed for execution of the auction process of the present embodiment.

Figure 3:
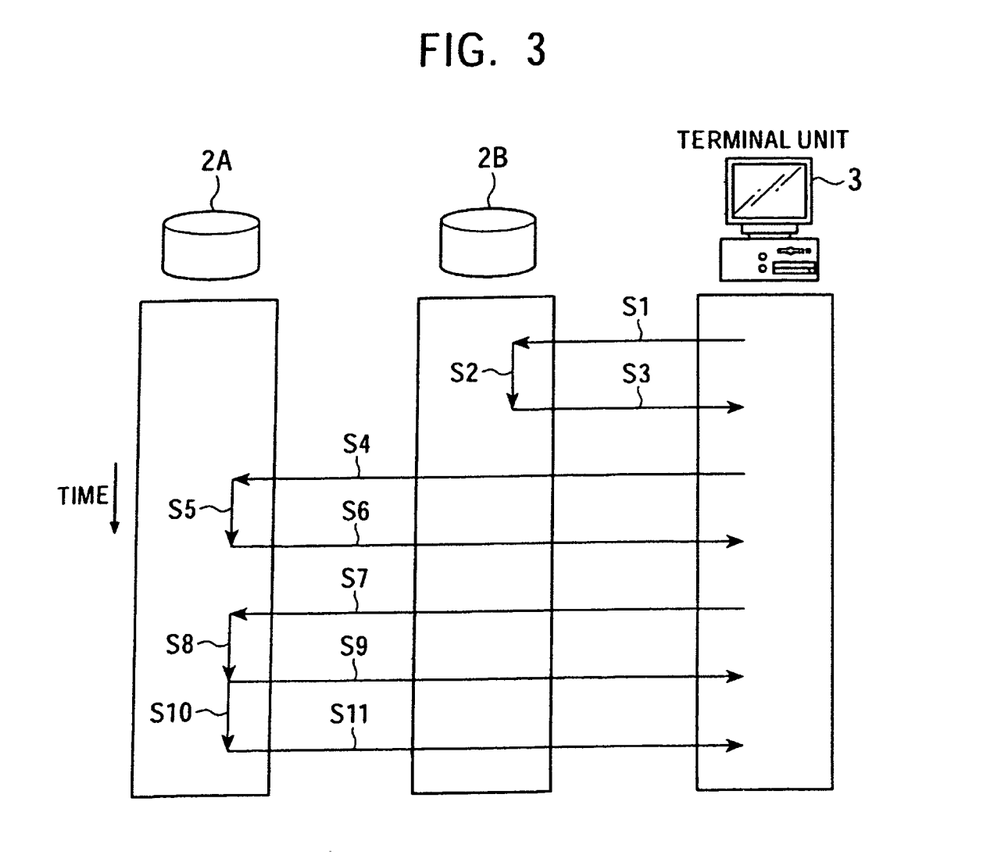
FIG. 3 is a flowchart indicating an exemplary processing to be executed between a terminal apparatus of a bidder participating in the auctioning and an auction management server or an advertisement space information management server.

Now, the processing to be executed in the auction system 10 according to the present embodiment will be described. With reference to FIG. 3, a flowchart is shown to illustrate an example of processing to be executed among a terminal apparatus 3 of a user (bidder) who take part in the auction by submitting a bid, the auction management server 2A and the advertisement space information management server 2B. In the auction system 10 according to the present embodiment, on the basis of the bid information offered from one or more bidders submitted via the terminal apparatuses 3, an advertisement space auction process is performed by the auction management server 2A and the advertisement space information management server 2B. The process of transaction of the advertisement space is executed upon completion of the auction process by settlement of accounts between the operator of the auction and the winning bidder, and by presenting the contents of the advertisement to the users designated by the winning bidder.

Figure 4:
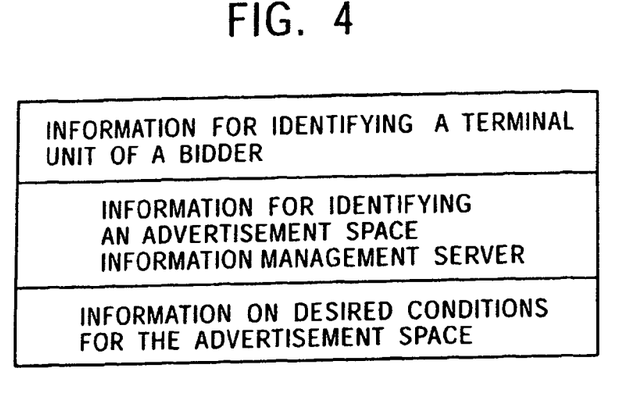
FIG. 4 is a block diagram showing an exemplary data structure of access information transmitted from the terminal apparatus of the bidder.

With reference to FIG. 3, as a first step S1, access information from a bidder is submitted from the terminal apparatus 3 to the advertisement space information management server 2B. The advertisement space information management server 2B handles a plurality of access information submitted from the plurality of terminal apparatuses 3. FIG. 4 indicates an example of data structures of access information to be sent from these terminal apparatuses 3. The access information is comprised, for example, of an identification information uniquely assigned to each one of the terminal apparatuses 3, an identification information of the advertisement space information management server 2B to which the access information is addressed, and pieces of information indicating desirable conditions defined by the bidder for the advertisement space of his/her interest. In the following, an exemplary instance for communicating with one terminal apparatus 3 and a transaction therewith will be described representatively.

When the access information from a bidder is received by the advertisement space information management server 2B, particular pieces of advertisement space information relating to one or more advertisement spaces corresponding to the access information received is specified in the advertisement space information management server 2B. Here, it is assumed that the one or more advertisement space information is provided in advance in the database under control thereof.

Figure 5:
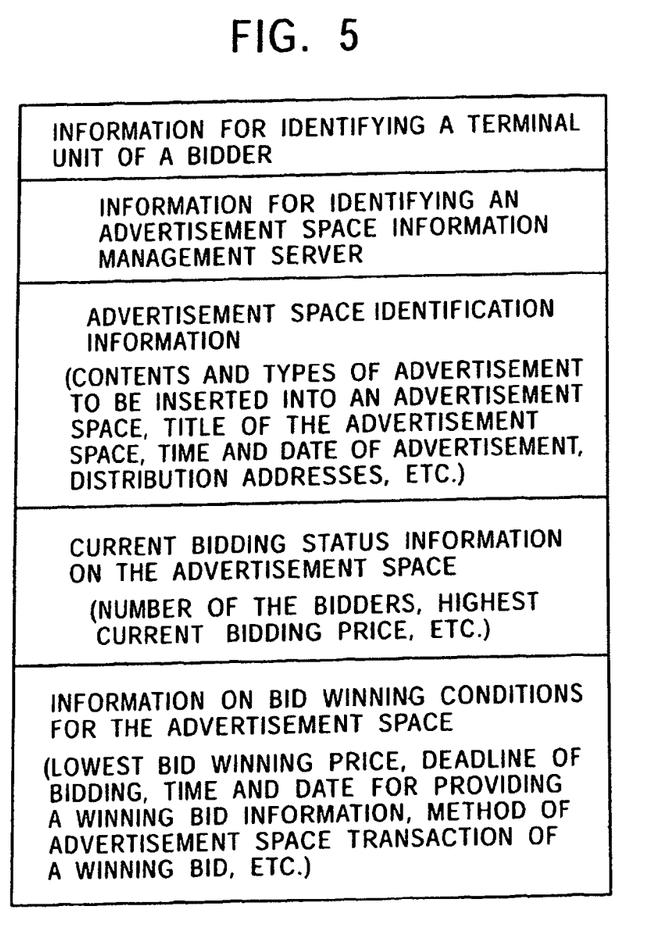
FIG. 5 is a block diagram showing an exemplary data structure of advertisement space information.

With reference to FIG. 5, an example of data structures of the advertisement space information set in the database of the advertisement space information management server 2B is indicated. The advertisement space information is comprised, for example, of an identification information of the terminal apparatus 3 of the bidder who is interested in the advertisement space, an identification information of the advertisement space information management server 2B, an identification information of the advertisement space, current bid status information of the advertisement space, and information indicating winning bid terms and conditions for the advertisement space. Among those described above, the identification information of the advertisement space may further include information relating to the advertisement space such as contents to be inserted in its advertisement, a type of insertion of the advertisement, a title of the advertisement space, a date and time for posting the advertisement, recipient addressees of the advertisement, and the like. The current bid status information of the advertisement space includes information relating to the advertisement space such as the number of bidders, a highest bid price currently offered, and the like. Further, the terms and conditions requested for winning the bid on the advertisement space includes information relating to the advertisement space such as a lowest winning bid price, a bid submission date and time, a scheduled date and time for providing winning bid information, a method of transaction with a winning bidder and the like.

On the basis of the desired conditions described by the bidder for the advertisement space contained in the access information, the advertisement space information stored in the data base as described above is searched and identified by the advertisement space information management server 2B. For example, when the above-mentioned identification information of the advertisement space, the current bid status information on the advertisement space, the conditions requested for winning the bid on the advertisement space and the like are contained in the access information sent from the bidder together with his/her desired conditions for acquisition of the advertisement space, the data base is searched through on the basis of these information.

When the advertisement space information is identified and specified, in the next step S3, the advertisement space information thus specified is forwarded from the advertisement space information management server 2B to the terminal apparatus 3 of the corresponding bidder via the network 1. Further, in step S3, a format data for entry of the bid information is sent from the advertisement space information management server 2B to the terminal apparatus 3 of the corresponding bidder via the network 1.

Figure 6:
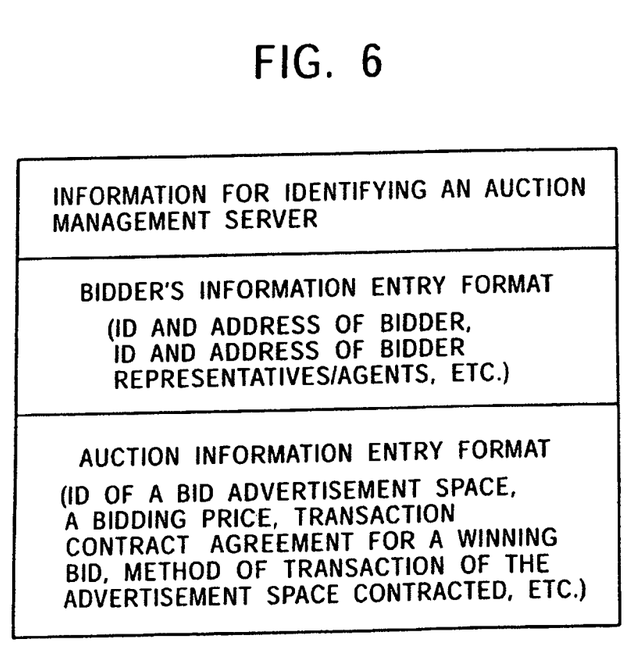
FIG. 6 is a block diagram showing an exemplary data structure of a format for entry of bid information.

With reference to FIG. 6, an example of format data for entry of the bid information is indicated. The format data for the bid information is comprised, for example, of an identification information of the auction management server 2A, a format for entry of information relating to the bidder, and a format for entry of information relating to his/her bidding. The format of information relating to the bidder further includes an identification information of the bidder, a contact address of the bidder, an identification information of a representative/agent of the bidder, and the like. The identification information of the bidder may be the name of the bidder, or may be issued uniquely to the bidder who accessed to the advertisement space information management server 2B. Further, the identification information of the representative/agent of the bidder may be omitted if they place no representative/agent. The format of the bid information includes an identification information of the advertisement space for which to tender a bit, a bid price, a voucher to a transaction agreement and transaction method at the time of winning of the advertisement space, and the like. The identification-information of the advertisement space for which to tender the bit can be selected, for example, from those provided from the advertisement space information management server 2B to the terminal apparatus 3 of the bidder when the bidder accessed to the advertisement space information management server 2B.

By enabling to provide the bid information in such formatted way as described above to those who want to bid, process efficiency in the auction system 10 can be substantially improved. Further, by submitting the formatted data for entry of the bid information from the auction system 10 to the terminal apparatuses 3 of the bidders, an open auctioning may be realized thereby allowing participation of any arbitrary bidder.

The format for entry of the bid information is received at the terminal apparatus 3 of the bidder. In accordance with the received format for entry of the bid information, required information is filled in for preset items one by one until the bid information is completed. The completed bid information is then sent from the terminal apparatus 3 of the bidder to the auction management server 2A via the network 1.

The completed bid information is received by the auction management server 2A, and stored, for example, in storage section 21. At this instant, original data of the bid status information is updated (step S5). As described above, in the auction system 10, the original data of the bid status information is stored in the auction management server 2A. When the original data of the bid status information is updated in the auction management server 2A, in the next step S6, new bid status information after updating is sent from the auction management server 2A to the terminal apparatus 3 of the corresponding bidder via the network 1.

Subsequent steps S7, S8 and S9 are executed only when required. In the step S7, a bid contents update request information which contains renewed bid contents for updating is sent from the terminal apparatus 3 of the bidder to be received by the auction management server 2A via the network 1. In the next step S8, on the basis of the bid contents update information received, the current bid information is corrected and also the bid status information is updated in the auction management server 2A. Then, in step S9, the updated bid status information is sent to the terminal apparatus 3 of the bidder via the network 1. By way of example, the steps S7 through S9 may be executed in repetition though not indicated.

The auction management server 2A will close bidding of the auction at a predetermined timing (step S10). For example, with respect to any advertisement space information, a predetermined period of time allowed for bidding until its closure is determined at the start of its auction. When the bidding is closed, winning bid information is generated on the basis of the result of bidding offered during the predetermined period of time allowed therefor. In step S11, the winning bid information thus generated is sent from the auction management server 2A to the terminal apparatuses 3 of the bidders, the advertisement space information management server 2B and the transaction execution system 4 via the network 1.

When the advertisement space information management server 2B receives the winning bid information, it deletes the advertisement space information of which the winning bidder has been determined from the database of the advertisement space information.

Meanwhile, the transaction execution system 10 when it receives the winning bid information, on the basis of the result of the auction performed by the auction system 10, allows for the advertisement information designated by the winning bidder to be provided to contents users via the advertisement space thereof awarded to the winning bidder. Further, a process of settlement of accounts (the winning bid transaction) with the winning bidder for the advertisement space is executed by the transaction execution system 4. This process of settlement of accounts can be executed prior to or after the provision of the advertisement information to the contents users via the advertisement space granted to the winning bidder.

Figure 7:
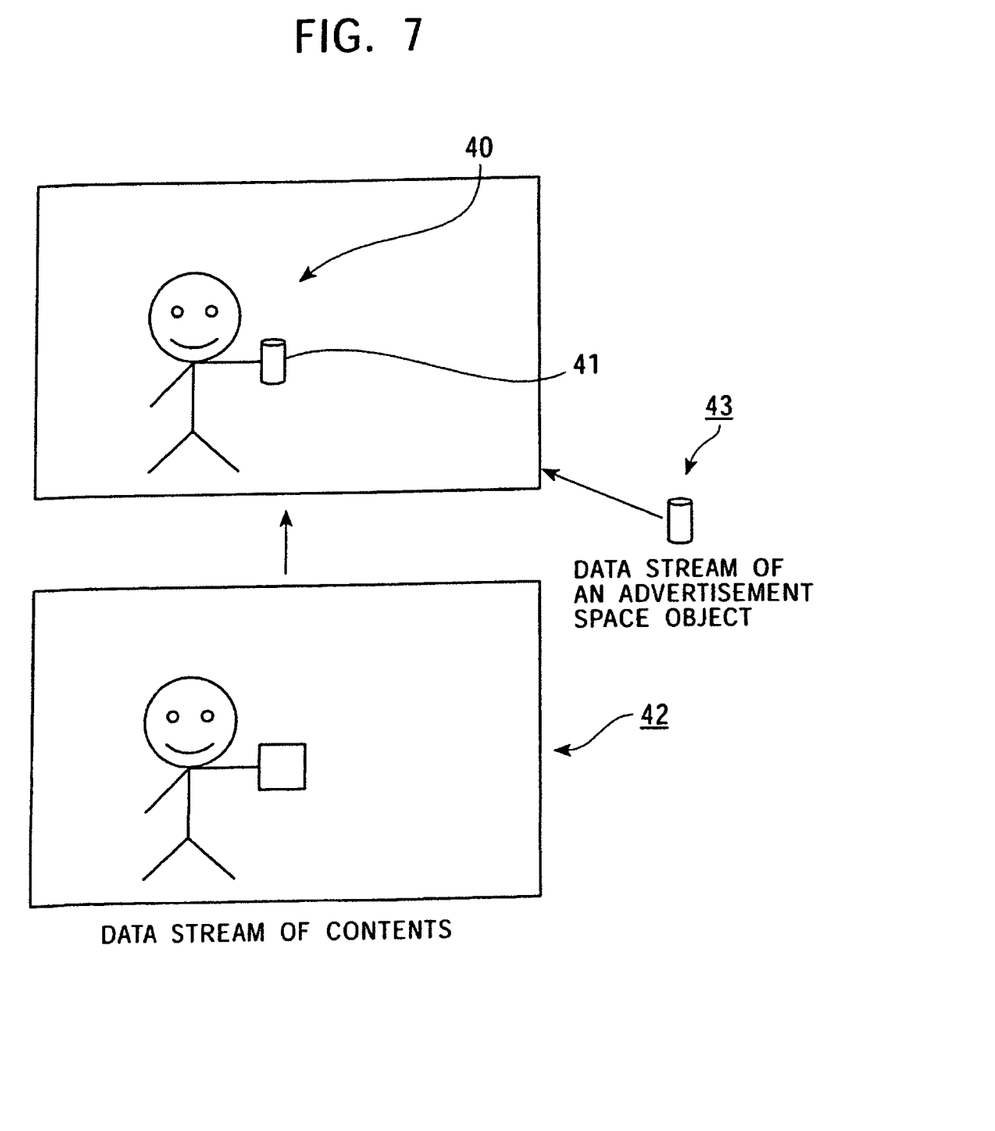
FIG. 7 is a schematic block diagram illustrating an example for inserting an advertisement space in the contents.

By way of example, the advertisement space information to be posted on the auction according to the present embodiment may include such an advertisement space that is provided in a state as directly inserted into the contents to be provided to the contents users. With reference to FIG. 7, an example how an advertisement is inserted into the contents is illustrated. FIG. 7 shows an example of advertisement spaces wherein a specific object designated by the bidder as the advertisement object is inserted or superimposed, for example, into a scene of a movie. As shown in this example, an object 41 is displayed as superimposed in one scene 40 of the movie as the advertisement space relating to the auctioning performed by the auction system 10.

In this case the advertisement is provided to the contents users in this manner as described above, the contents into which the advertisement object 41 is to be inserted or superimposed and the object 41 are carried separately in separate data streams 42 and 43 to the contents users. Here, it is assumed that the data stream 42 carrying the contents and the data stream 43 carrying the object 41 are reproduced in synchronism therebetween and displayed to the contents users by a reproducing terminal apparatus on the side of users receiving the contents. By posting this insertion type advertisement on the advertisement space auction according to the present embodiment, it is possible to realized a more open and versatile advertisement transactions.

According to another embodiment of the present invention, address information of scheduled recipient addressees of the advertisement may be contained in the advertisement space information. By arranging as above, participants in the auction can decide his/her bid more effectively in consideration of the information on the scheduled recipient addressees.

Furthermore, according to another embodiment of the present invention, a group of addressee clusters may be formulated, which contains contents users having a common characteristic such as a common hobby, taste, preference or the like. Each advertisement space may be set up corresponding to the group of addressee clusters respectively, and the information relating to the above-mentioned common characteristics may be contained in the advertisement space information. By arranging as above, the auction participants can submit their bids more effectively and strategically in consideration of their common characteristics.

Still more, according to another embodiment of the present invention, information relating to an evaluation of the advertisement space may be contained in the advertisement space information. Here, the information relating to the evaluation of the advertisement space refers to such information or items that have influences on the effect of its advertisement, for example, such as an advertisement distribution (broadcast) hour, distribution recipient addressees, a distribution method and the like. By arranging as above, respective auction participants are allowed to submit their bids more effectively in consideration of the particular information relating to the evaluation of each advertisement space.

Although the present invention has been described in its preferred form with a certain degree of particularity, obviously many changes, variations and combinations are possible therein. It is therefore to be understood that nay modifications will be practiced otherwise than as specifically described herein without departing from the scope of the present invention.

For example, in the embodiment of the present invention described hereinabove, its exemplary configuration and structure have been described for enabling to specify one or more advertisement spaces on the basis of the information that indicates the desired conditions of the bidder with respect to the advertisement space as shown in FIG. 4. However, it is not limited thereto and many other modifications thereof may be conceived within the scope of the present invention.

According to another embodiment of the present invention, various other constructions for enabling to specify the appropriate advertisement space can be adopted on the basis of, for example, the identification information of the bidder and the particularity information of the business the bidder is engaged or concerned with.

In the present embodiment, it becomes necessary to receive their business characteristic information from the bidders at the time of their accessing or in advance. Using the business characteristic information unique to each bidder, it becomes possible effectively to provide the advertisement space information which is more suitable to the business characteristic of each bidder. For example, in the case where a particular bidder is engaged in a business for providing services to a particular customer segment, this information is especially effective. Namely, if the above-mentioned arrangement of the present invention is adopted in the above case, and the information relating to the particular customer segment is included in the business characteristic information, it becomes possible selectively to provide an appropriate advertisement space which is to be scheduled for provision to the particular bidder.

In the above described embodiments, it has been described that the format data for entry of the bid information is provided from the auction system 10 to the terminal apparatuses 3 at the time of execution of the auction. However, it is not limited thereto. For example, the bid information may be submitted in arbitrary format. Also, the format data for entry of the bid information may be provided to the terminal apparatuses 3 of the bidders in advance.

Further, in the above described embodiments, it has been described by way of example of the configuration and construction of the auction system 10 that has two servers of the auction management server 2A and the advertisement space information management server 2B. However, it is not limited thereto. For example, as indicated in an auction system 10' in FIG. 8, the present invention may be implemented also with such a construction that the functions of the auction management server 2A and the advertisement space information management server 2B are distributed and shared by a plurality of bidders' servers 30.

Figure 8:
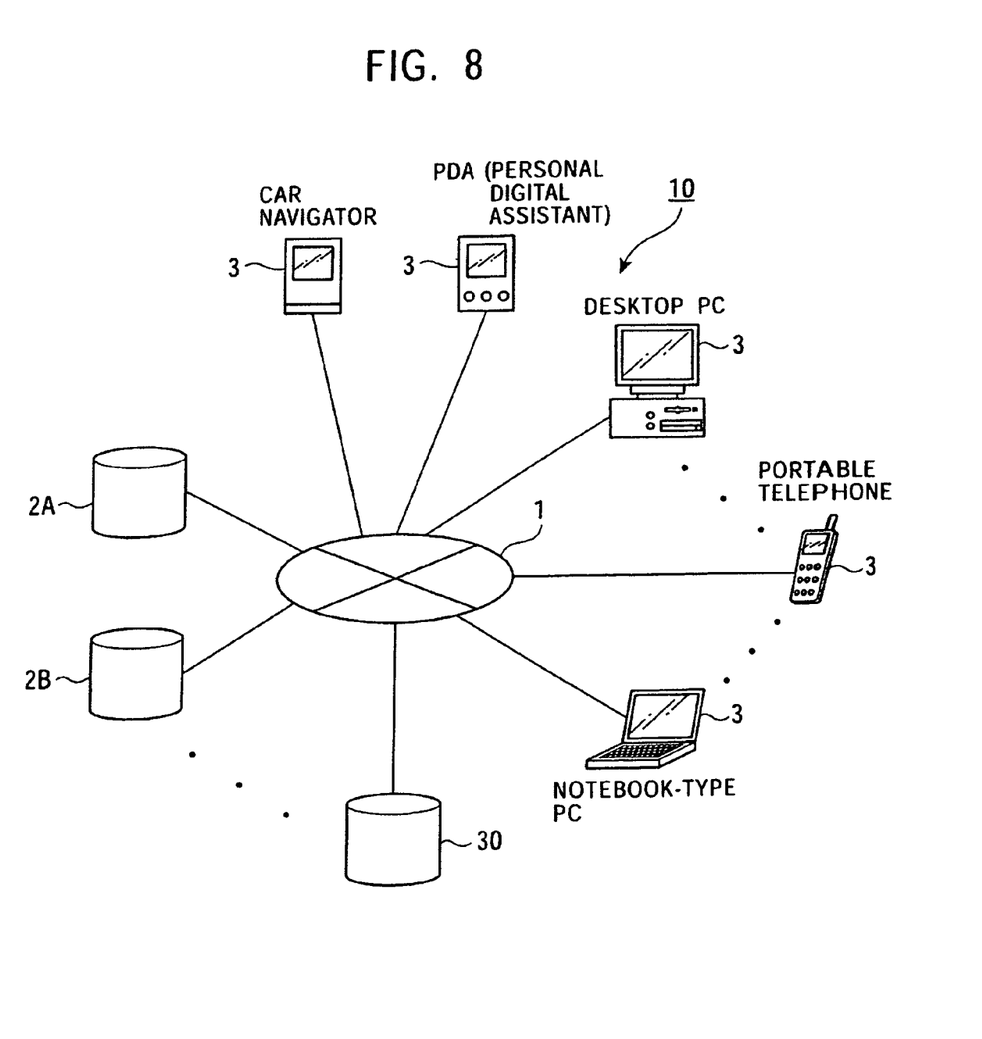
FIG. 8 is a schematic block diagram indicating another example of configurations of the auction system of the invention.

According to the arrangement of the auction system 10 of the foregoing embodiment, while a load and risk imposed on the auction management server 2A and the advertisement space information management server 2B increase, there is such an advantage that its system design becomes relatively easy because there is no need to contrive for an exact synchronization of processing between the servers 2A and 2B, or sharing of functions therebetween. On the other hand, according to the arrangement of the auction system 10' as indicated in FIG. 8, while it is necessary to contrive for the exact synchronization of the processing and sharing of functions by the bidders' servers 30, there is such an advantage that the load and the risk to be imposed on respective servers are decreased. By way of example, according to the arrangement of FIG. 8, a relationship between a group of the bidders' servers that share the function of the auction management server and a group of the bidders' servers that share the function of the advertisement space information management server may be either of all match, a partial match, all disparity, or one inclusive of the other. Alternatively, if the servers have a redundant capability, one of the servers may be assigned with both the functions of the auction management server and the advertisement space information management server.

Still further, although the auction system according to the preferred embodiment of the present invention has been described hereinabove that it has the auction management server and the advertisement space information management server, or that it has the plurality of servers to which the functions of the above-mentioned two types of servers are distributed to be shared therebetween. However, the present invention is not limited thereto. For example, the present invention can also be implemented as applied to a pier-to-pier type system in which direct data swapping among the respective apparatuses 3 is performed, or to a server-less system.

Still more, although it has been described hereinabove that according to the preferred embodiment of the present invention, the advertisement space information of which the winning bidder is determined is deleted from the data base of the advertisement space information on the advertisement space information management server 2B. However, it is not limited thereto. The present invention can also be implemented so as to have such an arrangement that allows for the advertisement space information of which the winning bidder is determined to be processed in other various ways, for example, such as consequently to record in the data base the fact that the advertisement space has been awarded to the winning bidder, or to transfer its advertisement space information to another data base provided for recording the advertisement space information the winning bidder of which has been determined.

Furthermore, although according to the preferred embodiment of the present invention it has been described hereinabove that the storage section 21, the processing section 22 and the I/F section 24 are integrated in the servers 2A and 2B, it is not limited thereto. The present invention can also be implemented by such an arrangement that all or part of the functions of the storage section 21, the processing section 22 and the I/F section 24 are distributed and shared by a plurality of computers.

Still more, according to the preferred embodiment of the present invention described hereinabove, although an access control when accessing to the storage section 21 is not referred to, such control methods as the password authentication, apparatus authentication or individual authentication may be adopted therefor.

Still further, according to the preferred embodiment of the present invention described hereinabove, although it has been described that each identification information unique to each terminal apparatus 3 is assigned. However, it is not limited thereto. For example, the present invention may adopt such an arrangement in which there is assigned each identification information unique to each participant who takes part in the auction. Thereby, the plurality of participants can take part in each step of the auction via different terminal apparatuses 3.

Finally, as the configurations and structures of respective units and portions described specifically with respect to the preferred embodiments of the present invention are only examples of realization of the present invention, so the embodiments thereof should not be construed as to limiting the technical scope of the present invention, the present invention is not limited to the preferred embodiments described above, thus any variation as well as any combination and/or sub combination of the embodiments is permitted, without departing from the scope of the present invention.

The invention claimed is:

1. A method for delivering an advertisement using a network, comprising:
   correlating an advertisement object with an object in content, wherein the content is adapted to be displayed as a scene having an advertisement space associated with the object, and wherein the advertisement object is from an advertiser determined to be a winning bidder, wherein the winning bidder is one who offered, during an auction process for bidding for the advertisement space, a highest bid price over the network for the advertisement space within a bid submission period having a maximum length during which bidding in the auction process is permitted,
   wherein a second time period starts after acceptance of a highest bid as last bid information for the advertisement space, wherein the second time period has a length less than the maximum length of the bid submission period and wherein more bid information can be received over the network during the second time period so long as the more bid information is received within the bid submission period,
   wherein, if the second time period elapses after the acceptance of the last bid information and within the bid submission period, the bid submission period ends immediately, and
   wherein, if an end of the bid submission period occurs at the maximum length from a start of the bid submission period and before the second time period elapses, the bid submission period ends and no more bid information can be received over the network;
   in response to a request for the content, providing to a user the content including the object with the advertisement object; and
   providing, by a processor, for display of the scene of the content including the object with the correlated advertisement object at the advertisement space of the scene in synchronism as one scene of the content.

2. The method according to claim 1, wherein the advertisement object is selected by an auction.

3. The method according to claim 1, wherein the advertisement object is designated by a winning bidder in an auction.

4. The method according to claim 1, wherein the advertisement object is displayed as superimposed in the one scene of the content.

5. The method according to claim 1, wherein the object in the content and the correlated advertisement object are delivered separately in separate data streams to the user.

6. The method according to claim 1, wherein the advertisement object is directly inserted into the content.

7. A system for delivering an advertisement using a network, comprising:

an advertisement unit for correlating an advertisement object with an object in content, wherein the content is adapted to be displayed as a scene having an advertisement space associated with the object, and wherein the advertisement object is from an advertiser determined to be a winning bidder, wherein the winning bidder is one who offered, during an auction process for bidding for the advertisement space, a highest bid price over the network for the advertisement space within a bid submission period having a maximum length during which bidding in the auction process is permitted, wherein a second time period starts after acceptance of a highest bid as last bid information for the advertisement space, wherein the second time period has a length less than the maximum length of the bid submission period and wherein more bid information can be received over the network during the second time period so long as the more bid information is received within the bid submission period, wherein, if the second time period elapses after the acceptance of the last bid information and within the bid submission period, the bid submission period ends immediately, and wherein, if an end of the bid submission period occurs at the maximum length from a start of the bid submission period and before the second time period elapses, the bid submission period ends and no more bid information can be received over the network; and a delivery unit, including a processor, for providing to a user, in response to a request for the content, the content including the object with the advertisement object, and providing for display of the scene of the content including the object with the correlated advertisement object at the advertisement space of the scene in synchronism as one scene of the content.

8. The system according to claim 7, wherein the advertisement object is selected by an auction.

9. The system according to claim 7, wherein the advertisement object is designated by a winning bidder in an auction.

10. The system according to claim 7, wherein the advertisement object is displayed as superimposed in the one scene of the content.

11. The system according to claim 7, wherein the object in the content and the correlated advertisement object are delivered separately in separate data streams to the user.

12. The system according to claim 7, wherein the advertisement object is directly inserted into the content.

* * * * *